United States Patent
Durniak (10) Patent No.: US 10,457,032 B2
(45) Date of Patent: Oct. 29, 2019

(54) METHODS AND SYSTEMS FOR SEPARATING A PLURALITY OF DIRECTED SELF-ASSEMBLED DIAMAGNETIC COMPONENTS

(71) Applicant: SelfArray, Inc., Troy, NY (US)

(72) Inventor: Mark Durniak, Lafayette, CO (US)

(73) Assignee: SelfArray, Inc., Troy, NY (US)

( * ) Notice: Subject to any disclaimer, the term of this patent is extended or adjusted under 35 U.S.C. 154(b) by 0 days.

(21) Appl. No.: 16/032,289

(22) Filed: Jul. 11, 2018

(65) Prior Publication Data

US 2019/0016108 A1 Jan. 17, 2019

Related U.S. Application Data

(60) Provisional application No. 62/531,506, filed on Jul. 12, 2017.

(51) Int. Cl.
  *B32B 43/00* (2006.01)
  *B08B 7/00* (2006.01)

(52) U.S. Cl.
  CPC .......... *B32B 43/006* (2013.01); *B08B 7/0035* (2013.01); *B08B 2220/01* (2013.01); *B32B 2457/00* (2013.01); *Y10S 156/93* (2013.01); *Y10T 156/1111* (2015.01); *Y10T 156/1116* (2015.01); *Y10T 156/1153* (2015.01); *Y10T 156/1168* (2015.01); *Y10T 156/1189* (2015.01); *Y10T 156/1195* (2015.01)

(58) Field of Classification Search
  CPC .......... Y10T 156/1111; Y10T 156/1116; Y10T 156/1153; Y10T 156/1168; Y10T 156/1189; Y10T 156/1195; Y10S 156/93; Y10S 156/941; B32B 43/006
  See application file for complete search history.

(56) References Cited

U.S. PATENT DOCUMENTS

| | | | | |
|---|---|---|---|---|
| 5,383,997 A | * | 1/1995 | Minowa | B05C 13/02 118/423 |
| 6,503,356 B1 | * | 1/2003 | Sakai | H01L 21/67092 156/247 |
| 8,349,116 B1 | * | 1/2013 | Bibl | H01L 21/67144 156/249 |
| 9,011,638 B2 | * | 4/2015 | Hsu | H01L 21/67005 156/703 |
| 10,199,247 B2 | * | 2/2019 | Tkachenko | B23P 19/033 |

* cited by examiner

*Primary Examiner* — Mark A Osele
(74) *Attorney, Agent, or Firm* — Heslin Rothenberg Farley and Mesiti PC (57) ABSTRACT

Methods for separating a plurality of diamagnetic directed self-assembled diamagnetic components are provided. One method includes, for instance: contacting a release substrate to the plurality of diamagnetic components, the plurality of diamagnetic components including a non-diamagnetic component affixed to a diamagnetic portion by a first adhesive, and removing the release substrate, the non-diamagnetic component being affixed to a final substrate by a second adhesive and the release substrate being affixed to the diamagnetic portion by a third adhesive, and wherein the removing removes the diamagnetic portion and at least a portion of the first adhesive from the non-diamagnetic component.

15 Claims, 11 Drawing Sheets

METHODS AND SYSTEMS FOR SEPARATING A PLURALITY OF DIRECTED SELF-ASSEMBLED DIAMAGNETIC COMPONENTS

CROSS-REFERENCE TO RELATED APPLICATION

This application claims priority benefit under 35 U.S.C. § 119(e) to U.S. Provisional Application No. 62/531,506, filed 12 Jul. 2017, and entitled METHODS AND SYSTEMS FOR SEPARATING A PLURALITY OF DIRECTED SELF-ASSEMBLED DIAMAGNETIC COMPONENTS, the entirety of which is incorporated herein by reference in its entirety.

FIELD OF THE INVENTION

The present invention relates to methods and systems for separating a plurality of assembled diamagnetic components into a plurality of assembled and clean non-diamagnetic components affixed to a final substrate and a plurality of diamagnetic portions affixed to a release substrate, and more particularly, separating a plurality of directed self-assembled light emitting diodes from pyrolytic graphite after transfer and bonding to a printed circuit board.

BACKGROUND

Directed self-assembly (DSA) of diamagnetic components is a high-speed, low-cost manufacturing technique to assembly components into a grid-array. This is extremely useful for applications such as large-area light emitting diode (LED) displays, luminaires, and photovoltaic devices. The diamagnetic DSA process requires a thin layer of diamagnetic material to be affixed to the component thereby creating a layered component, henceforth called a diamagnetic component.

BRIEF SUMMARY

The shortcomings of the prior art are overcome and additional advantages are provided through the provisions, in one aspect, a method for separating a plurality of diamagnetic components that includes, for instance: contacting a release substrate to the plurality of diamagnetic components, the plurality of diamagnetic components including a non-diamagnetic component affixed to a diamagnetic portion by a first adhesive, and removing the release substrate, the non-diamagnetic component being affixed to a final substrate by a second adhesive and the release substrate being affixed to the diamagnetic portion by a third adhesive, and wherein the removing removes the diamagnetic portion and at least a portion of the first adhesive from the non-diamagnetic component.

In another aspect, a method includes, for instance: a submersing the plurality of diamagnetic components in a solvent, the plurality of diamagnetic components including a non-diamagnetic component affixed to a diamagnetic portion by a first adhesive, and removing, by the solvent, the diamagnetic portion and at least a portion of the first adhesive from the non-diamagnetic component, the non-diamagnetic component being affixed to a final substrate by a second adhesive.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure. Note also that reference is made below to the drawings, which are not drawn to scale for ease of understanding, wherein the same reference numbers used throughout different figures designate the same or similar components.

Due to the unique process of DSA of diamagnetic components, a layer of diamagnetic material may be left on the non-diamagnetic component. In some cases, it is desirable to remove the diamagnetic material after assembly and bonding to a final substrate. Such situations include, for example, the removal of a diamagnetic portion, for instance the opaque diamagnetic material pyrolytic graphite, or PG, from the backs of non-diamagnetic components, such as flip-chip LEDs affixed to a printed circuit board used in display or lighting. In some embodiments, the PG would block the light produced, at least partially, by the LED. With such applications there can be a huge number of assembled diamagnetic components, which must be separated, and one-by-one processes such as pick-and-place are not suitable at scale. Therefore, it is desirable to develop methods of separating a plurality of assembled and diamagnetic components in a parallel fashion to increase throughput.

Generally stated, disclosed herein are methods and systems of separating a plurality of assembled diamagnetic components. Advantageously, the methods allow for efficient and parallel separation with little or no residue left on the plurality of assembled non-diamagnetic components.

Figure 1:
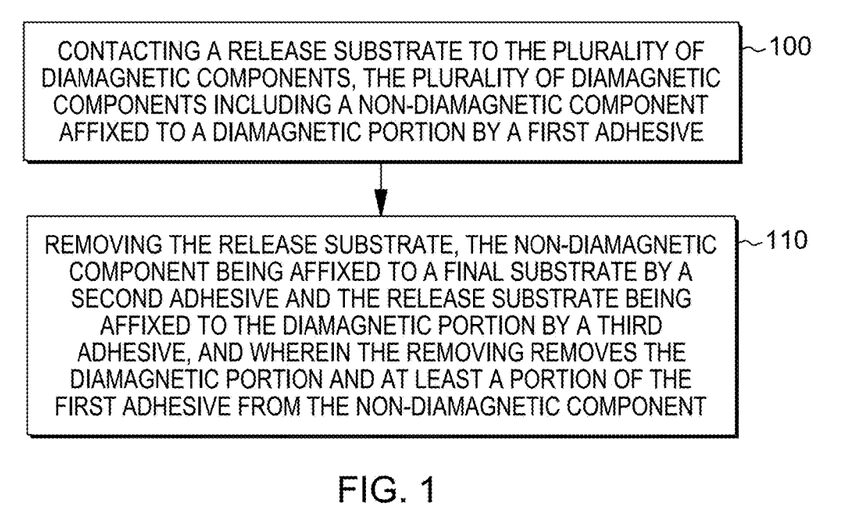
FIG. 1 depicts one embodiment of a method of separating a plurality of assembled diamagnetic components, in accordance with one or more aspects of the present invention.

In one aspect, in one embodiment, as shown in FIG. 1, a method of separating a plurality of directed self-assembled diamagnetic components may include contacting a release substrate to the plurality of diamagnetic components, the plurality of diamagnetic components including a non-diamagnetic component affixed to a diamagnetic portion by a first adhesive 100; and removing the release substrate, the non-diamagnetic component being affixed to a final substrate by a second adhesive and the release substrate being affixed to the diamagnetic portion by a third adhesive, and wherein the removing removes the diamagnetic portion and at least a portion of the first adhesive from the non-diamagnetic component.

Figure 2:
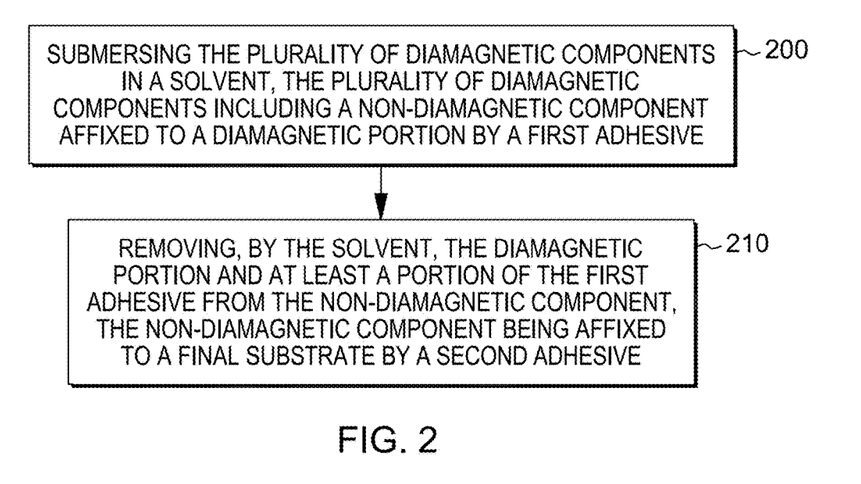
FIG. 2 depicts another embodiment of a method of separating a plurality of assembled diamagnetic components, in accordance with one or more aspects of the present invention.

In an alternative embodiment, as shown in FIG. 2, a method of separating a plurality of directed self-assembled diamagnetic components may include submersing the plurality of diamagnetic components in a solvent, the plurality of diamagnetic components including a non-diamagnetic component affixed to a diamagnetic portion by a first adhesive 200; and removing, by the solvent, the diamagnetic portion and at least a portion of the first adhesive from the non-diamagnetic component, the non-diamagnetic component being affixed to a final substrate by a second adhesive 210.

Figure 3:
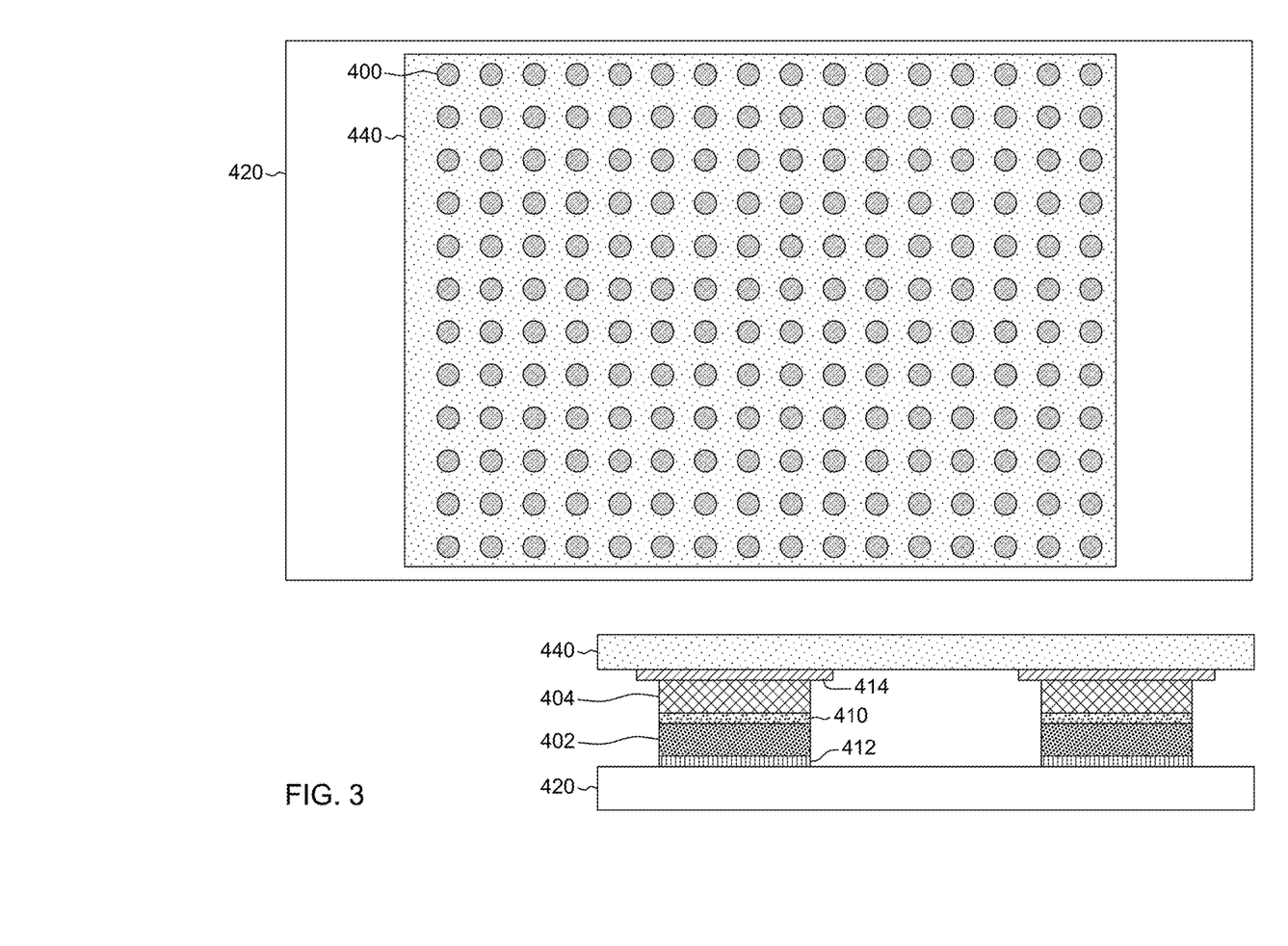
FIG. 3 depicts a top view and cross-sectional elevation view of one embodiment of a system including a diamagnetic component comprised of a non-diamagnetic layer affixed to a diamagnetic layer by a weak adhesive and a plurality of assembled diamagnetic components with the non-diamagnetic layers affixed to a final substrate and the diamagnetic layers affixed a release substrate with a strong adhesive, in accordance with one or more aspects of the present invention.

An example of a system for which the methods disclosed herein are useful is depicted in FIG. 3, including a plurality of diamagnetic components 400, which may have been disposed by directed self-assembly, each diamagnetic component consisting of a non-diamagnetic component 402, affixed with a first adhesive 410 to a diamagnetic portion 404. The first adhesive 410 may be a relatively weaker adhesive designed to separate more readily under less force than later described adhesives. The non-diamagnetic components 402 are affixed to a final substrate 420 by a second adhesive 412 and the diamagnetic portions 404 are affixed to a release substrate 440 by a third adhesive 414. The adhesives may each include polymer resins, Van der Waals attraction, surface tension, solder, or any other now known or later developed adhesion, as understood by those skilled in the art. The first adhesive may have a first adhesion force which is weaker than either or both of the second adhesive and the third adhesive, based on a second and third adhesive force, respectively. The final substrate 420, and release substrate 440 may be rigid or flexible and may be comprised of materials such as metal, glass, plastic, or any other material known to those skilled in the art. The release substrate may have been used as a transfer substrate: moving affixed diamagnetic components 400 to the final substrate before affixing the diamagnetic components 400 to the final substrate 420, and thus operating as both a transfer substrate for applying self-assembled diamagnetic components 400 from a stage to the final substrate 420 and for separating the diamagnetic portion 404 from the non-diamagnetic component 402.

The first adhesion, for instance by an adhesive 410, between the non-diamagnetic component 402 and diamagnetic 404, may be weaker than both the second adhesion, which can include adhesion from a second adhesive 412, between the non-diamagnetic component 402 and the final substrate 420, and the third adhesion, which may include the third adhesive 414. The second and third adhesives 412 and 414 may include different adhesion forces or the same adhesive.

The diamagnetic portion 404 may be any diamagnetic material, including but not limited to pyrolytic graphite, bismuth, or any other material known to those skilled in the art. The non-diamagnetic component 402 may be a semiconductor device, such as a light emitting diode, transistor, or any other device known to those skilled in the art, which may be assembled in a pattern or array onto a substrate.

In one embodiment, the non-diamagnetic components 402 include light emitting diodes. In these embodiments, the contact pads (not shown) are on a bottom side of the non-diamagnetic components 402 and may be affixed to the final substrate 420, in one example a printed circuit board. The contact pads may be affixed by a second adhesive 412, for instance, by solder, which can electrically connect the non-diamagnetic component 402 to the final substrate 420, allowing for the semiconductor component to operate. In some embodiments, the diamagnetic portions 404 can include pyrolytic graphite affixed to the release substrate 440 by a strong, third adhesive 414, such as epoxy. Further, the first adhesive 410 between the light emitting diodes and pyrolytic graphite can include a, relative to the second and third adhesive, weaker adhesive, for instance a polymer adhesive.

As illustrated in FIG. 3, the release substrate 440 and the final substrate 420 are both in place. In some embodiments, the plurality of diamagnetic components 400 may be affixed to the final substrate 420 following contact between the release substrate 440 and the diamagnetic components 400. For instance, when the transfer substrate is designed to be used as the release substrate 440, the diamagnetic components 400 are contacted first and then placed in contact with the final substrate 400, so that the release substrate 440 is in place and ready for removal.

Figure 4:
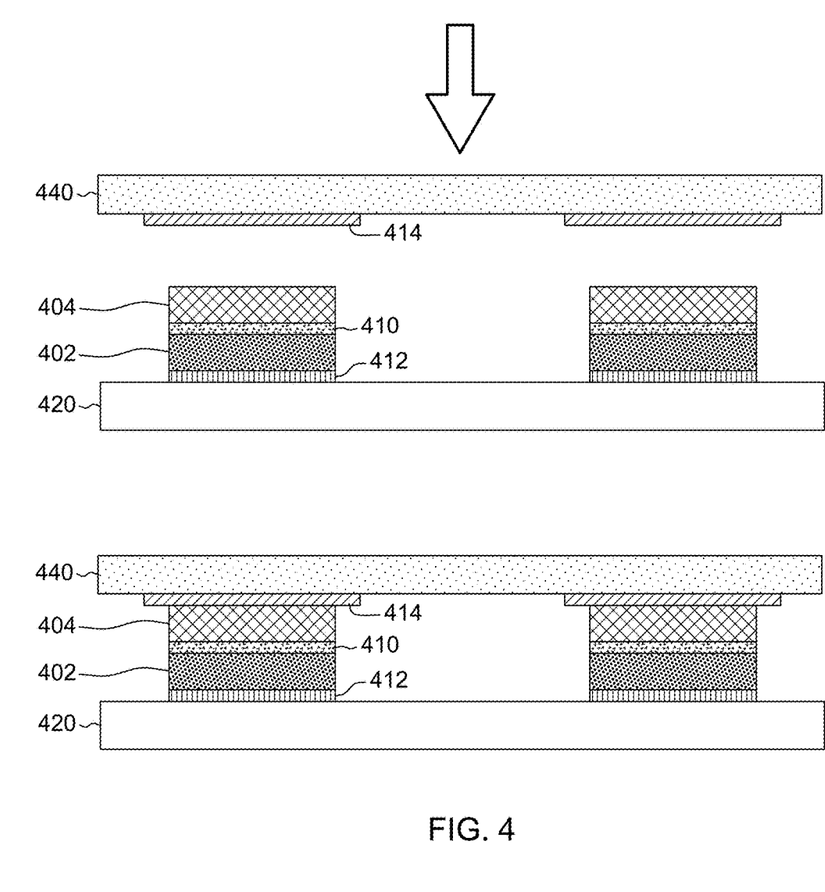
FIG. 4 depicts a cross-sectional elevation view of one embodiment of a system including a plurality of assembled diamagnetic components comprised of a non-diamagnetic layer affixed to a diamagnetic layer by a weak adhesive the non-diamagnetic layers affixed to a final substrate with a strong adhesive, and a release substrate coated with strong adhesive being brought into contact with the diamagnetic layers, in accordance with one or more aspects of the present invention.

In another embodiment, as shown in FIG. 4, a plurality of diamagnetic components 400 with a non-diamagnetic portion 402, affixed with a first adhesive 410 to a diamagnetic layer 404, are affixed to final substrate 420, with a second adhesive 412, prior to contact with the release substrate 440, for instance by a different transfer substrate not pictured. Once in place, a release substrate 440, coated with another strong, third adhesive 414, is lowered onto the assembled diamagnetic components 400 and the diamagnetic portions 404 affix themselves to the release substrate 440 via the adhesive 414. In these embodiments, the diamagnetic components 400 are affixed to the final substrate 420 prior to the contact with the release substrate 440.

Figure 5:
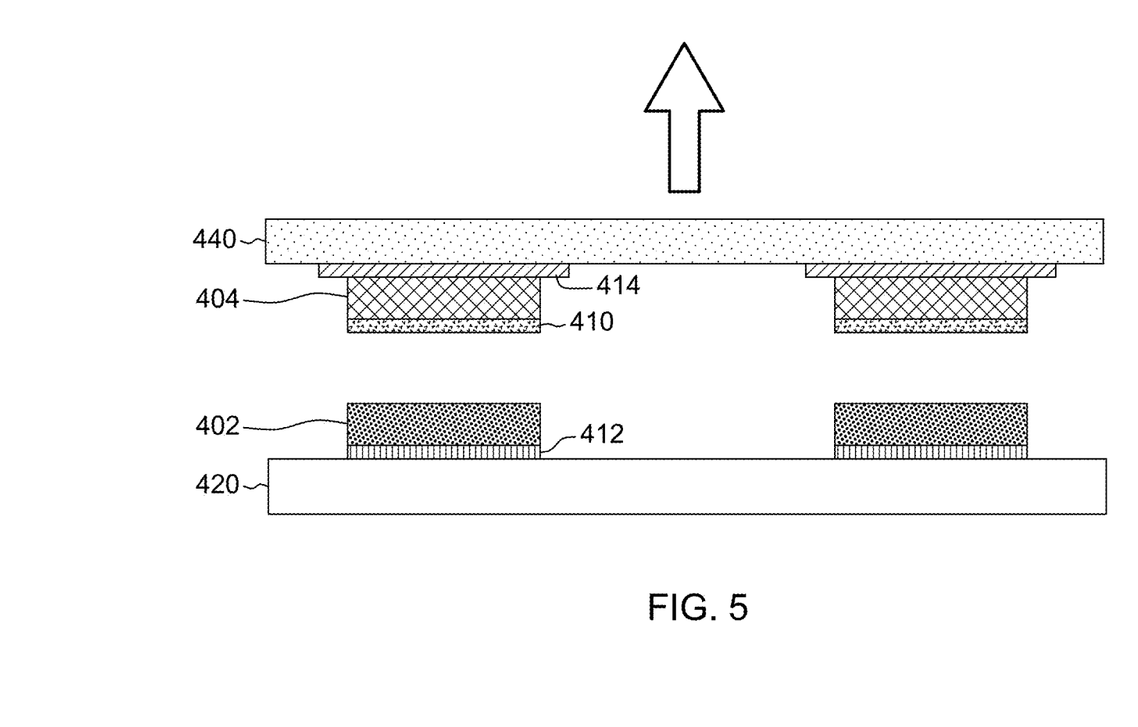
FIG. 5. depicts a cross-sectional elevation view of one embodiment of a system including releasing the weaker adhesive between the non-diamagnetic and diamagnetic layers of a diamagnetic component by lifting the release substrate and affixed diamagnetic layers orthogonally away from the final substrate, in accordance with one or more aspects of the present invention.

A cross-sectional elevation view of one embodiment is depicted in FIG. 5, wherein the first adhesive 410 between the non-diamagnetic component 402 and diamagnetic portion 404 is released by lifting the release substrate 440 substantially orthogonally away from the final substrate 420 and affixed non-diamagnetic components 402. In lifting the release substrate 440, the affixed diamagnetic portion 404, third adhesive 414, and at least a portion of first adhesive 410 are removed from the now, at least partially, exposed non-diamagnetic component 402.

Figure 6:
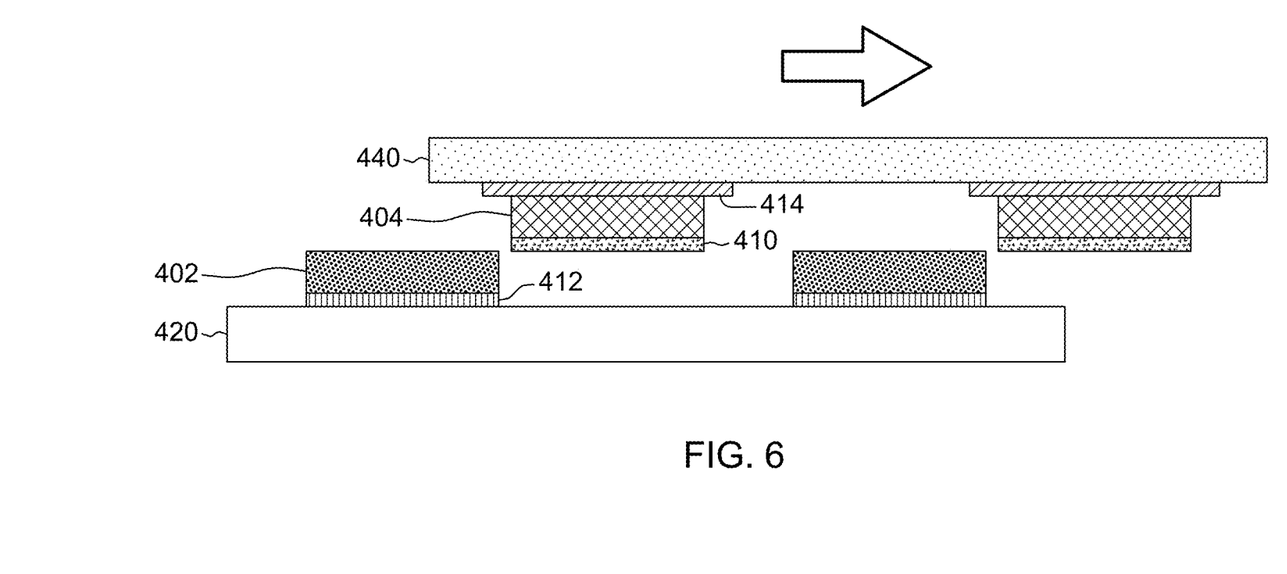
FIG. 6 depicts a cross-sectional elevation view of one embodiment of a system including releasing the weaker adhesive between the non-diamagnetic and diamagnetic layers of a diamagnetic component by shearing the release substrate and affixed diamagnetic layers parallel to the final substrate, in accordance with one or more aspects of the present invention.

In a cross-sectional elevation view of another embodiment is depicted in FIG. 6, the first adhesive 410 between the non-diamagnetic component 402 and diamagnetic portion 404 is released, at least partially, by shearing the release substrate 440, removing the affixed diamagnetic portion 404, third adhesive 414, and at least a portion of first adhesive 410. Shearing can be achieved by moving the release substrate in a substantially parallel direction to the surface of the final substrate 420 and affixed non-diamagnetic components 402, affixed by second adhesive 412.

Figure 7:
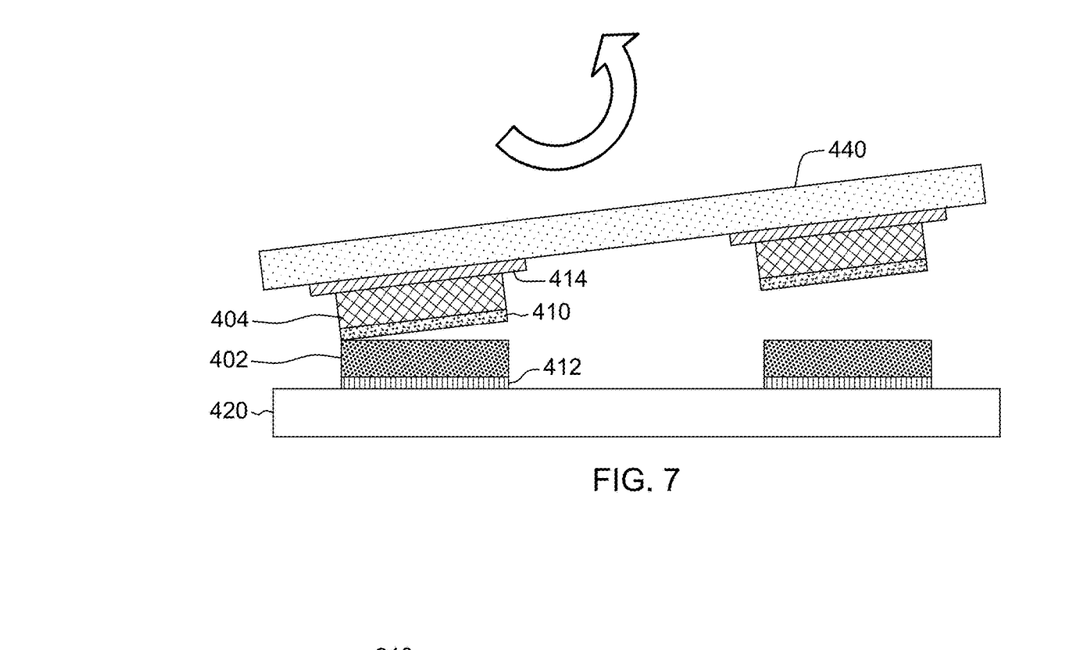
FIG. 7 depicts a cross-sectional elevation view of one embodiment of a system including releasing the weaker adhesive between the non-diamagnetic and diamagnetic layers of a diamagnetic component by peeling the release substrate and affixed diamagnetic layers away from the final substrate, in accordance with one or more aspects of the present invention.

In another embodiment, illustrated as a cross-sectional elevation view as depicted in FIG. 7, the first adhesive 410 between the non-diamagnetic component 402 and diamagnetic portion 404 is released by peeling the release substrate 440, i.e., pulling one side up before the opposite side. The affixed diamagnetic portion 404, third adhesive 414, and at least a portion of first adhesive 410 are pulled away from the final substrate 420 and affixed non-diamagnetic components 402. Peeling may be useful with a release substrate 440 which is flexible, or with a flexible final substrate 420. Although described as moving the release substrate 440, in all of the embodiments it should be understood that the structure could be flipped and the final substrate 420, being on top, may be removed. Additionally, as illustrate in FIGS. 6-8, the orientation can remain the same, but the final substrate 420 may still be moved, keeping release substrate 440 fixed in position. Finally, both substrates may be moved simultaneously, utilizing any of the above removal movements, including more than one in combination.

In each of the embodiments depicted in FIGS. 5-7, the first adhesive 410 may be heated to ease the removal process. For instance, an elevated temperature and/or a temperature gradient may be applied, either directly or indirectly, causing a higher temperature at the first adhesive 410, which can assist the release process. The heat may be applied indirectly, taking care not to heat the other elements too much, or more directly to only affect the first adhesive 410.

In some embodiments, depending on the first adhesive 410 and the conditions of the removal of the release substrate 412, some of the weak adhesive 410 may remain on the non-diamagnetic component 402 after separating it from the diamagnetic portion 404. In some embodiment, it may be desirable to remove entirely the remaining first adhesive 410 for certain applications and devices, for instance in the use of an LED or other lighting application.

Figure 8:
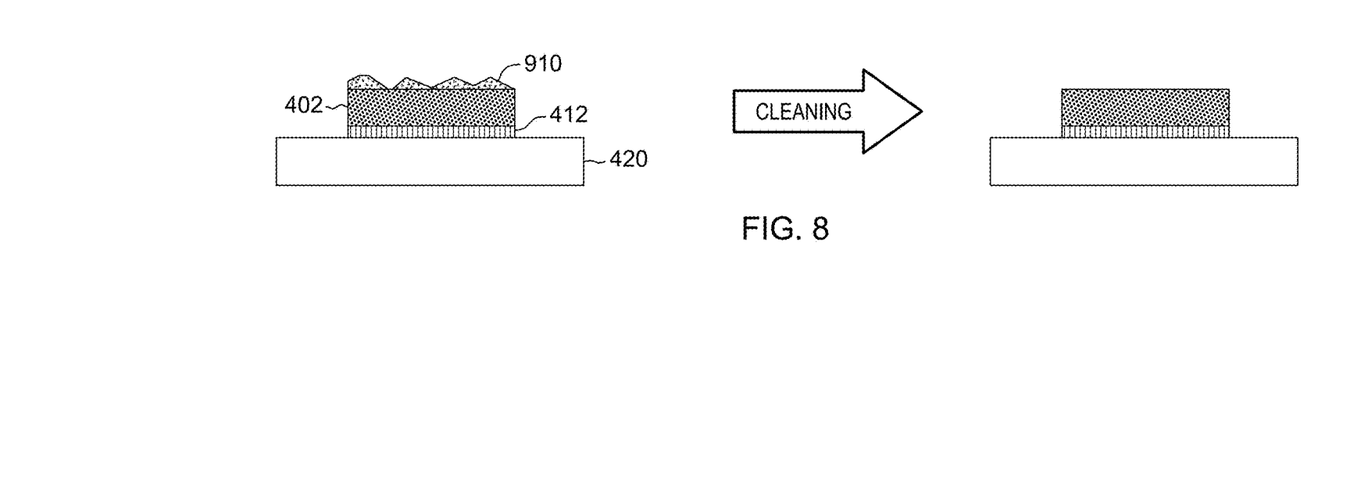
FIG. 8 depicts a cross-sectional elevation view of one embodiment of a system including cleaning some or all of the weak adhesive remaining on the non-diamagnetic component, in accordance with one or more aspects of the present invention.

Turning to FIG. 8, in one embodiment, after release, some or all of the first adhesive 410 remains on the non-diamagnetic component 402, leaving residue 910 from first adhesive 410 (FIGS. 6-8). The final substrate 420 with the non-diamagnetic components 402 affixed with second adhesive 412, is placed through a cleaning cycle, which may remove some or all of the remaining residue 910, but does not affect the final substrate 420, the non-diamagnetic component 402, or the second adhesive affixing it to the final substrate 412. In one embodiment the cleaning process may consist of a wet clean. For instance, at least a portion of the final substrate 420 may be submerged in a solvent, including but not limited to a solvent bath including acetone, water, alcohols, or any other solvents known to those skilled in the art which remove a weak adhesive or its residue, or a combination of these solvents. In another embodiment the cleaning of residue 910 may consist of dry cleaning process. For instance, a plasma cleaning, either in vacuum or in air, may be utilized to remove at least a portion of the remaining residue 910 from first adhesive 410. The plasma cleaning can include, but is not limited to, an oxygen plasma or UV induced ozone, or any other dry reactive process known to those skilled in the art capable of removing a relatively weak adhesive.

Figure 9:
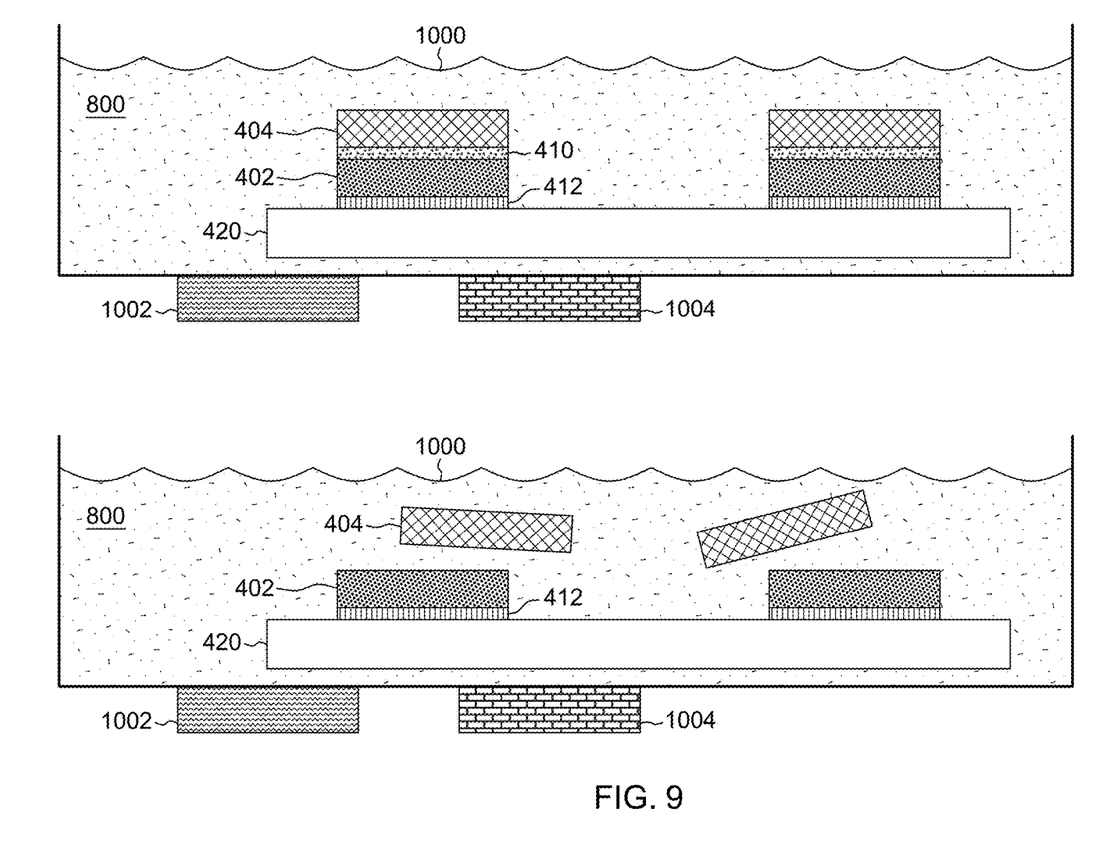
FIG. 9 depicts a cross-sectional elevation view of one embodiment of a system including a plurality of directed self-assembled diamagnetic components with the non-diamagnetic layers affixed to a final substrate submerged in a heated and agitated solvent bath, and the dissolving of the weak adhesive between the non-diamagnetic and diamagnetic layers releasing the diamagnetic layers, in accordance with one or more aspects of the present invention.
Figure 10:
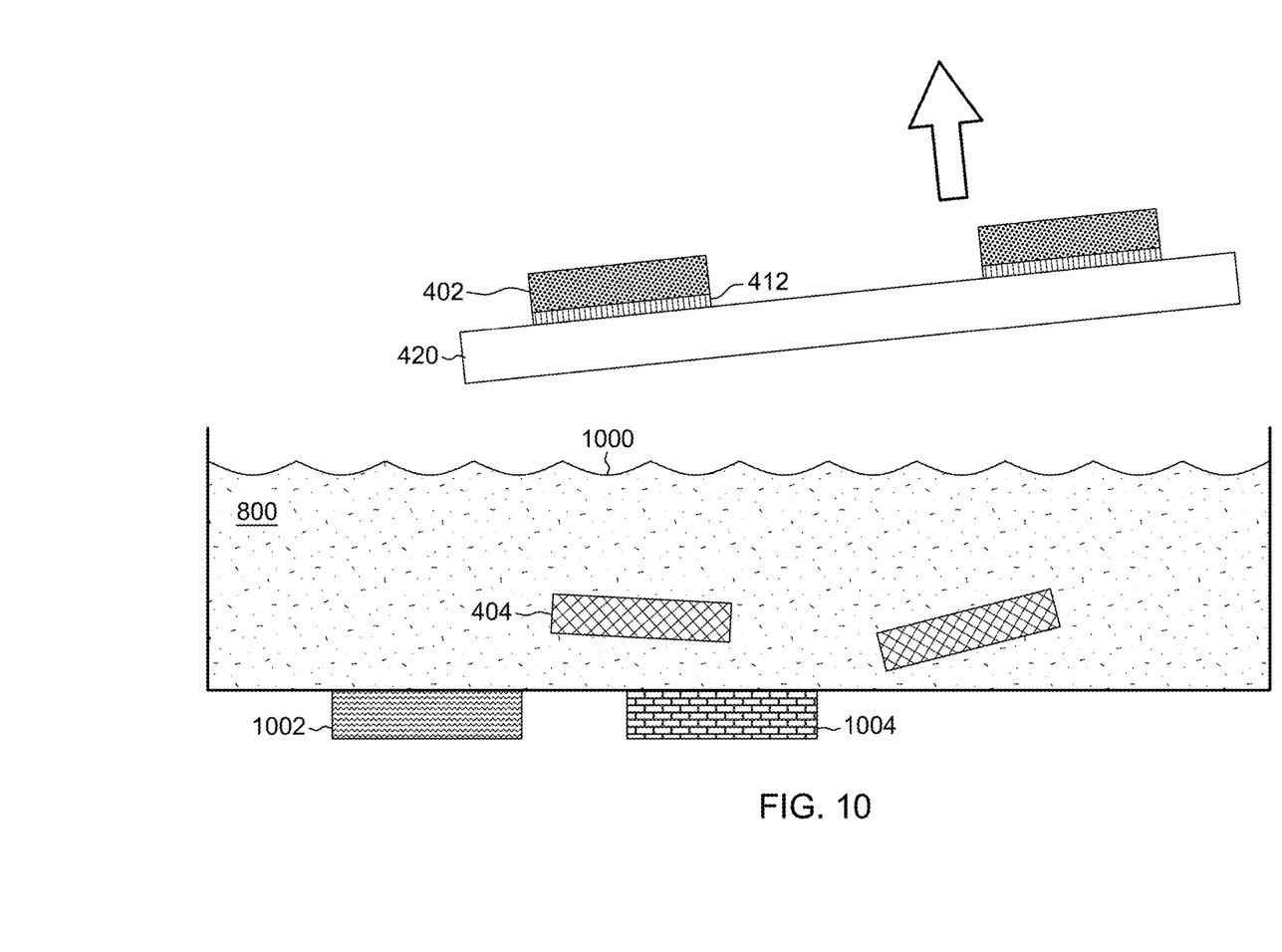
FIG. 10 depicts a cross-sectional elevation view of one embodiment of a system including removing the final substrate with affixed non-diamagnetic layers from the solvent bath leaving behind the diamagnetic layers, in accordance with one or more aspects of the present invention.

In another embodiment, shown in FIG. 9, a plurality of directed self-assembled diamagnetic components, wherein the non-diamagnetic components 402 are affixed to the final substrate 420 by the second adhesive 412, and the non-diamagnetic components 402 are affixed to the diamagnetic portions 404 with first adhesive 410, are placed into solvent bath 1000, submersing the diamagnetic components, at least partially. At least a portion of the first adhesive 410 is removed by the solvent, causing the diamagnetic portion 404 to be removed, while the non-diamagnetic component 402 remains affixed by the second adhesive 412 to the final substrate 420. The solvent used may be acetone, water, alcohols, or any other solvents known to those skilled in the art, including combinations thereof. In some embodiments, the solvent is chosen so as not affect the final substrate 420, the non-diamagnetic components 402, or the second adhesive 412 that affixes them. For instance, the solvent 800 may dissolve some or all of the first adhesive 410 between the diamagnetic portion 404 and non-diamagnetic component 402, releasing the diamagnetic layers 404. The final substrate 420 with the affixed non-diamagnetic layers 402, may then be removed from the bath devoid of the adhesive 410 and the diamagnetic layers 404 as shown in FIG. 10.

Returning to FIG. 9, in some embodiments, the solvent bath may be heated to an elevated temperature by means of a heater 1002, and/or agitated with an agitator 1004, in order to increase the amount of or speed at which first adhesive 410 is dissolved, or removed. The heater 1002 may be a resistive heater, lamp heater, or any other source of heat known to those skilled in the art effective at heating a solvent. The temperature should be sufficient to assist in removing the first adhesive 410 without affecting the final substrate 420, the second adhesive 412, or the non-diamagnetic component 402. The agitator 1004 may be a stir bar, ultrasonic transducer, impeller, or any other method known to those skilled in the art, which can assist in physical removal of the first adhesive 410 by jostling the material and moving the solvent, as well as assisting in removal by assuring that solvent 800 is uniform in composition and temperature. The diamagnetic components may have been affixed to the final substrate 420 prior to submersion in the solvent 800 or while submerged. As described in the above embodiments, the first adhesive 410 may be weaker than the second adhesive 412.

Figure 11:
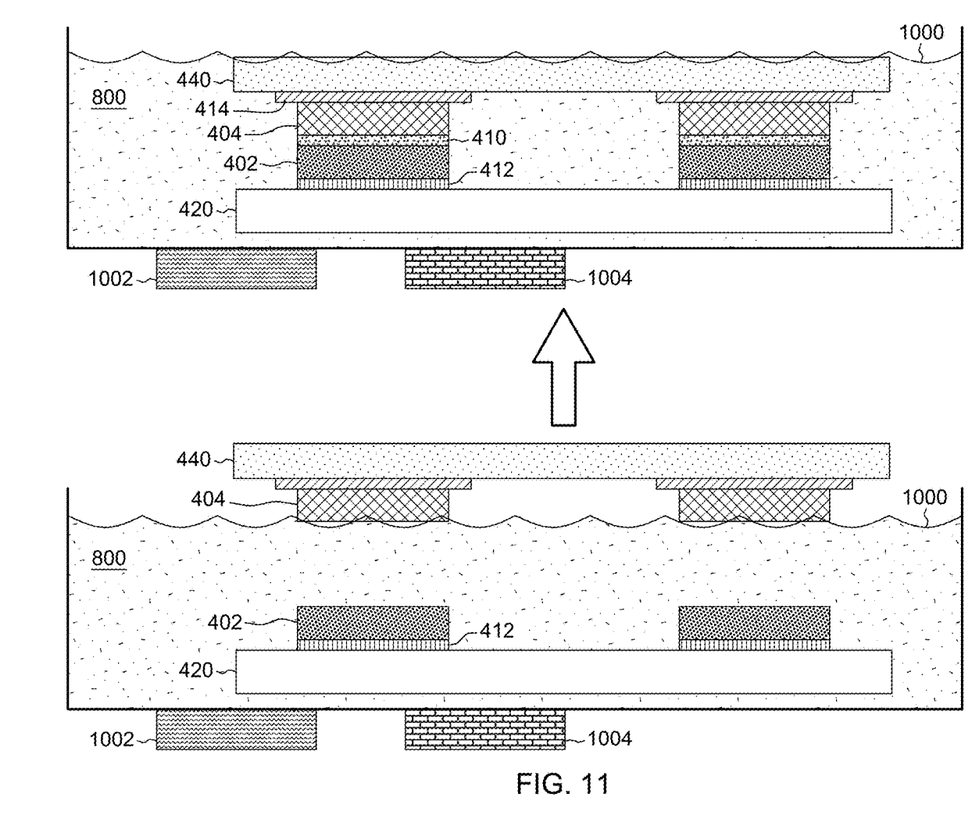
FIG. 11 depicts a cross-sectional elevation view of one embodiment of a system including a plurality of directed self-assembled diamagnetic components with the non-diamagnetic layers affixed to a final substrate and diamagnetic layers affixed to a release substrate submerged in a heated and agitated solvent bath, and the dissolving of the weak adhesive between the non-diamagnetic and diamagnetic layers releasing the diamagnetic layers and removing the released diamagnetic layers affixed to the release substrate, in accordance with one or more aspects of the present invention.
Figure 12:
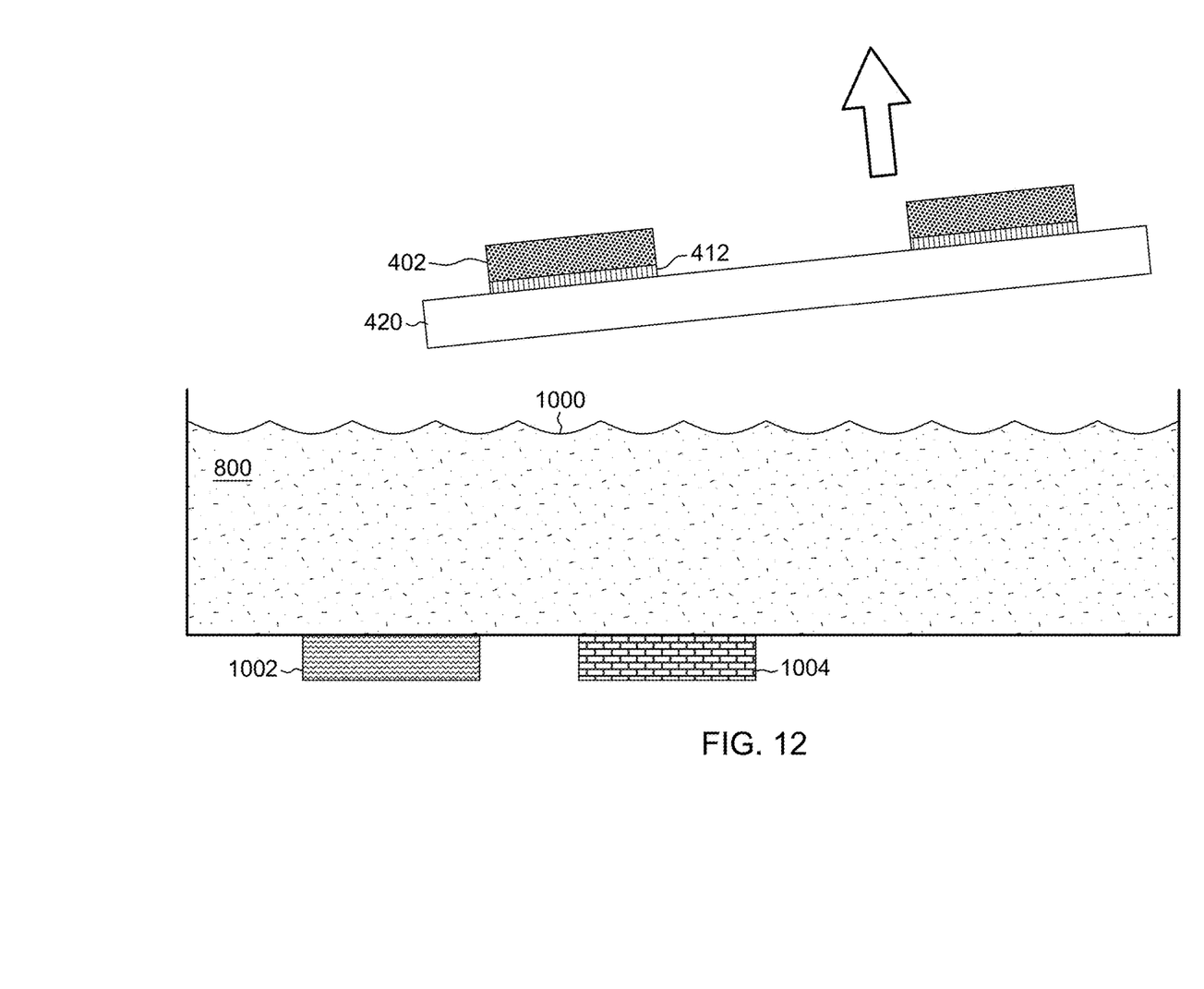
FIG. 12 depicts a cross-sectional elevation view of one embodiment of a system including removing the final substrate with affixed non-diamagnetic layers from the solvent bath, in accordance with one or more aspects of the present invention.

In a further embodiment, shown in FIG. 11, the plurality of directed self-assembled diamagnetic components with the non-diamagnetic components 402 affixed to the final substrate 420, non-diamagnetic components 402 affixed to the diamagnetic portions 404 with first adhesive 410, are placed into solvent bath 1000. Prior to or after submersion, the diamagnetic portions 404 may be affixed to a release substrate 440 with a third adhesive 414, which may be a stronger adhesive than the first adhesive 410. Thus, the release substrate 440 can be attached prior to placing in the solvent bath but after the plurality of diamagnetic components 400 have been affixed to the final substrate 420, or it could have been the transfer substrate used to move the plurality of diamagnetic components 400, prior to affixing to the final substrate 420. The solvent bath may be at an elevated temperature by means of a heater 1002, and/or agitated with an agitator 1004 as above. The solvent 800 dissolves the first adhesive 410, at least partially, between the diamagnetic portion 404 and non-diamagnetic component 402, releasing the diamagnetic portion 404. In some embodiments, the solvent is chosen so as not to affect the final substrate 420, the non-diamagnetic components 402, the release substrate 440, or the second or third adhesives 412 and 414 that affix them. The release substrate 440, with affixed diamagnetic portions 404, is removed after release from the solvent has at least partially taken place. The final substrate 420 with the affixed non-diamagnetic components 402, may then be removed from the bath devoid, at least partially, of the first adhesive 410 and the diamagnetic portions 404 as shown in FIG. 12. The solvent may be acetone, water, alcohols or any other solvents known to those skilled in the art, as well as combinations thereof.

Figure 13:
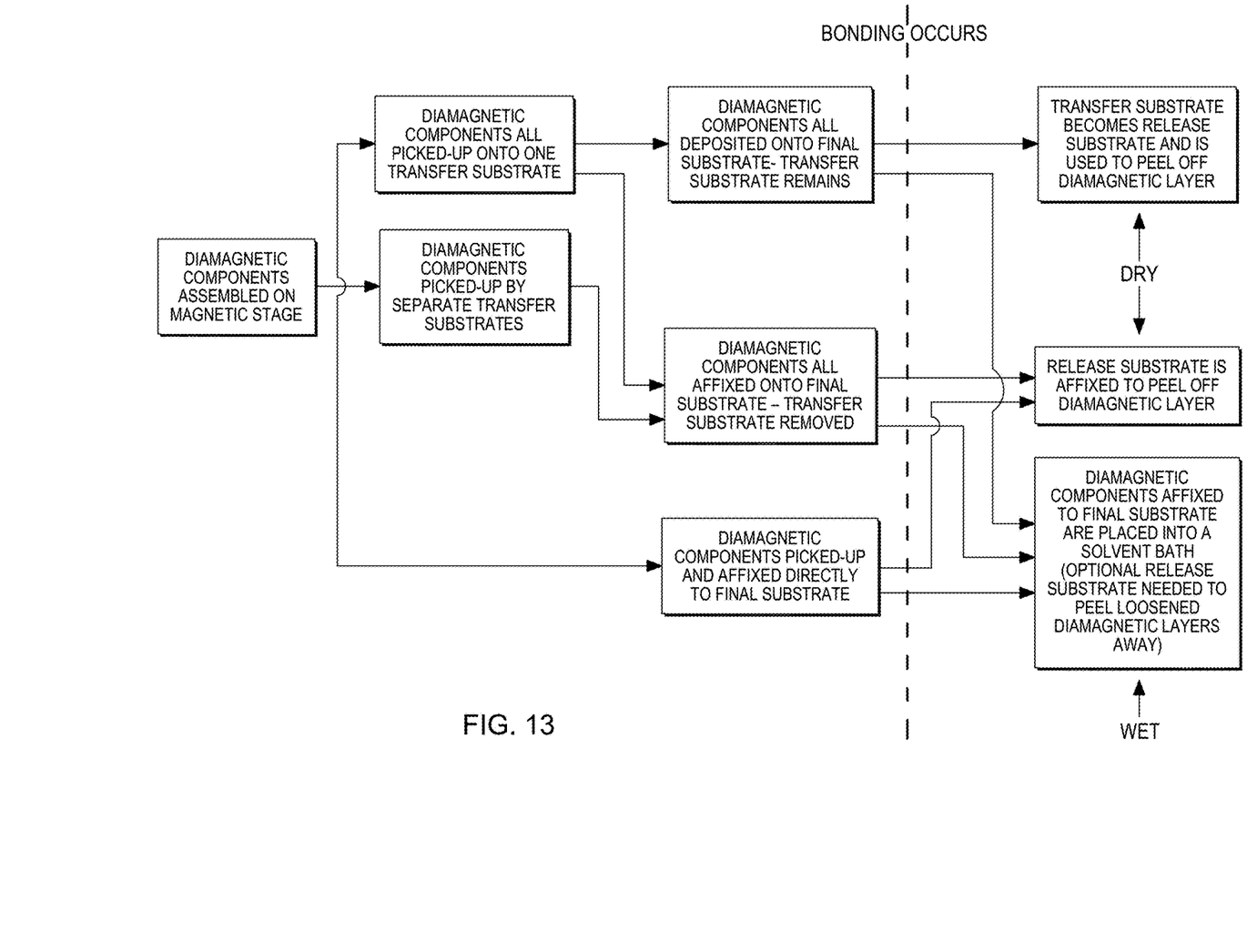
FIG. 13 depicts another embodiment of methods of separating a plurality of assembled diamagnetic components, in accordance with one or more aspects of the present invention.

Each of the embodiments depicted in FIGS. 5-10 is represented in the method chart FIG. 13, and in combination with an optional cleaning step, result in the parallel separation and removal of the diamagnetic layers leaving a plurality of clean, assembled, separated non-diamagnetic layers affixed to a final substrate. In one embodiment this includes, for example, an assembled grid-array of flip-chip light emitting diodes affixed with solder to a printed circuit board so as to be electrically connected to a driving circuit.

Thus, a quick and efficient method and system is provided for separating a plurality of directed self-assembled diamagnetic components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method for separating a plurality of diamagnetic components, the method comprising:
  contacting a release substrate to the plurality of diamagnetic components, the plurality of diamagnetic components including a non-diamagnetic component affixed to a diamagnetic portion by a first adhesive; and
  removing the release substrate, the non-diamagnetic component being affixed to a final substrate by a second adhesive and the release substrate being affixed to the diamagnetic portion by a third adhesive, and wherein the removing removes the diamagnetic portion and at least a portion of the first adhesive from the non-diamagnetic component.

2. The method of claim 1, wherein the first adhesive has a first adhesion force which is weaker than a second adhesion force of the second adhesive and a third adhesion force of the third adhesive.

3. The method of claim 1, wherein the plurality of diamagnetic components are affixed to the final substrate prior to the contacting.

4. The method of claim 1, wherein the plurality of diamagnetic components are affixed to the final substrate following the contacting.

5. The method of claim 1, wherein the removing includes lifting, peeling, or shearing.

6. The method of claim 1, wherein the first, second, and third adhesive are each chosen from a group consisting of: polymer resin, Van der Waals attraction, surface tension, solder, and epoxy.

7. The method of claim 1, wherein the diamagnetic portion includes pyrolytic graphite or bismuth.

8. The method of claim 7, wherein the non-diamagnetic component includes a light emitting diode.

9. The method of claim 1, further comprising: heating the first adhesive prior to the removing.

10. The method of claim 1, further comprising: cleaning the non-diamagnetic component.

11. The method of claim 10, wherein the cleaning includes submersing at least a portion of the final substrate in a solvent, the solvent removing a remaining portion of the first adhesive and not affecting the final substrate.

12. The method of claim 11, wherein the solvent includes at least one of acetone, water, and alcohol.

13. The method of claim 10, wherein the cleaning includes applying a plasma to the non-diamagnetic component.

14. The method of claim 13, wherein the plasma is applied in a vacuum.

15. The method of claim 13, wherein the plasma includes oxygen plasma or UV induced plasma.

* * * * *